(12) United States Patent
Chen

(10) Patent No.: US 6,491,418 B1
(45) Date of Patent: Dec. 10, 2002

(54) VEHICULAR EXHAUST PIPE WITH ILLUMINATING DEVICES

(76) Inventor: Kuo-Tai Chen, No. 2, Lane 368, Sec. 2, Fu Chiang Rd., Yung Kang City, Tainan Hsien (TW)

( * ) Notice: Subject to any disclaimer, the term of this patent is extended or adjusted under 35 U.S.C. 154(b) by 0 days.

(21) Appl. No.: 09/916,262

(22) Filed: Jul. 30, 2001

(51) Int. Cl.[7] .................................................. B60Q 1/00
(52) U.S. Cl. ........................ 362/487; 362/473; 362/293; 362/253; 362/540; 362/546; 181/227
(58) Field of Search ................................. 362/487, 473, 362/293, 294, 218, 253, 540, 546; 181/227

(56) References Cited

U.S. PATENT DOCUMENTS

| | | | |
|---|---|---|---|
| 5,036,947 A | * | 8/1991 | Metzger ..................... 181/241 |
| 5,508,478 A | * | 4/1996 | Barry .......................... 181/227 |
| 5,964,312 A | * | 10/1999 | Maldonado .................. 180/227 |
| 6,247,830 B1 | * | 6/2001 | Winnett et al. .............. 362/264 |

* cited by examiner

*Primary Examiner*—Stephen Husar
*Assistant Examiner*—Ronald E. DelGizzi
(74) *Attorney, Agent, or Firm*—Rosenberg, Klein & Lee

(57) ABSTRACT

An exhaust pipe with illuminating devices is formed by an inner pipe enclosed in an outer pipe. A gap is formed in between the two pipes. The gap comprises a light socket connected to at least one illuminating device. The light socket and the illuminating device are connected by means of an electric cord. The outer pipe comprises holes on its wall. When the illuminating devices are lighted, the light will shine from the tail end and the holes of the exhausting pipe either directly or reflectively.

5 Claims, 4 Drawing Sheets

VEHICULAR EXHAUST PIPE WITH ILLUMINATING DEVICES

BACKGROUND OF THE INVENTION

1. Field of the Invention

This invention relates to a vehicular exhaust pipe, more particularly to a pipe with illuminating devices.

2. Description of Prior Art

A conventional exhaust pipe adapted for use on a standard vehicle is made from a metal material, and is made to guide waste gas produced by the engine and the cylinder into the air. Typical prior art exhaust pipes are purely functional and not aesthetically pleasing.

The present invention provides an attractive and aesthetically pleasing exhaust pipe for vehicles.

SUMMARY OF THE INVENTION

It is the primary objective of the present invention to provide an exhaust pipe for a vehicle which generates light in order to make the exhaust pipe visually attractive It is another objective of the present invention to provide an exhaust pipe for a vehicle which emits light as a warning signal to other drivers.

DETAILED DESCRIPTION OF THE PREFERRED EMBODIMENT

Figure 1:
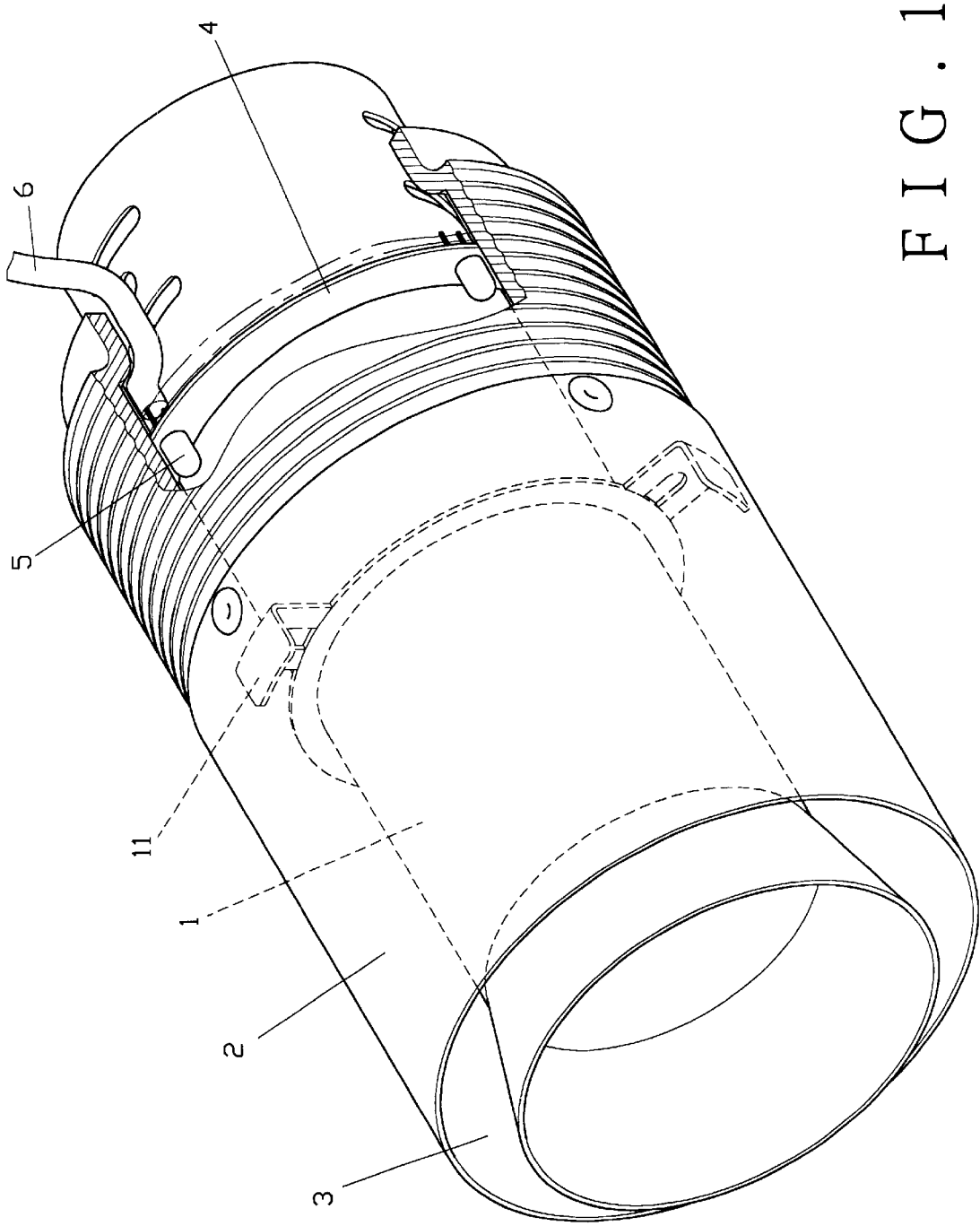
FIG. 1 is a perspective view of the present invention.

The exhaust pipe with illuminating devices of the present invention, as shown in FIG. 1, comprises an inner pipe 1 secured within an outer pipe 2 by means of fixtures 11 to form a gap 3 between the two pipes 1 and 2.

The gap 3 has a light socket 4 and at least one illuminating device 5 secured therein. The light socket 4 and illuminating device 5 are connected to each other by an electric cord 6. A controlling device not shown in the drawings) is connected inbetween the illuminating device 5 and the electric cord 6 to turn the illuminating device 5 on and off in sequence or in an irregular pattern.

Figure 2:
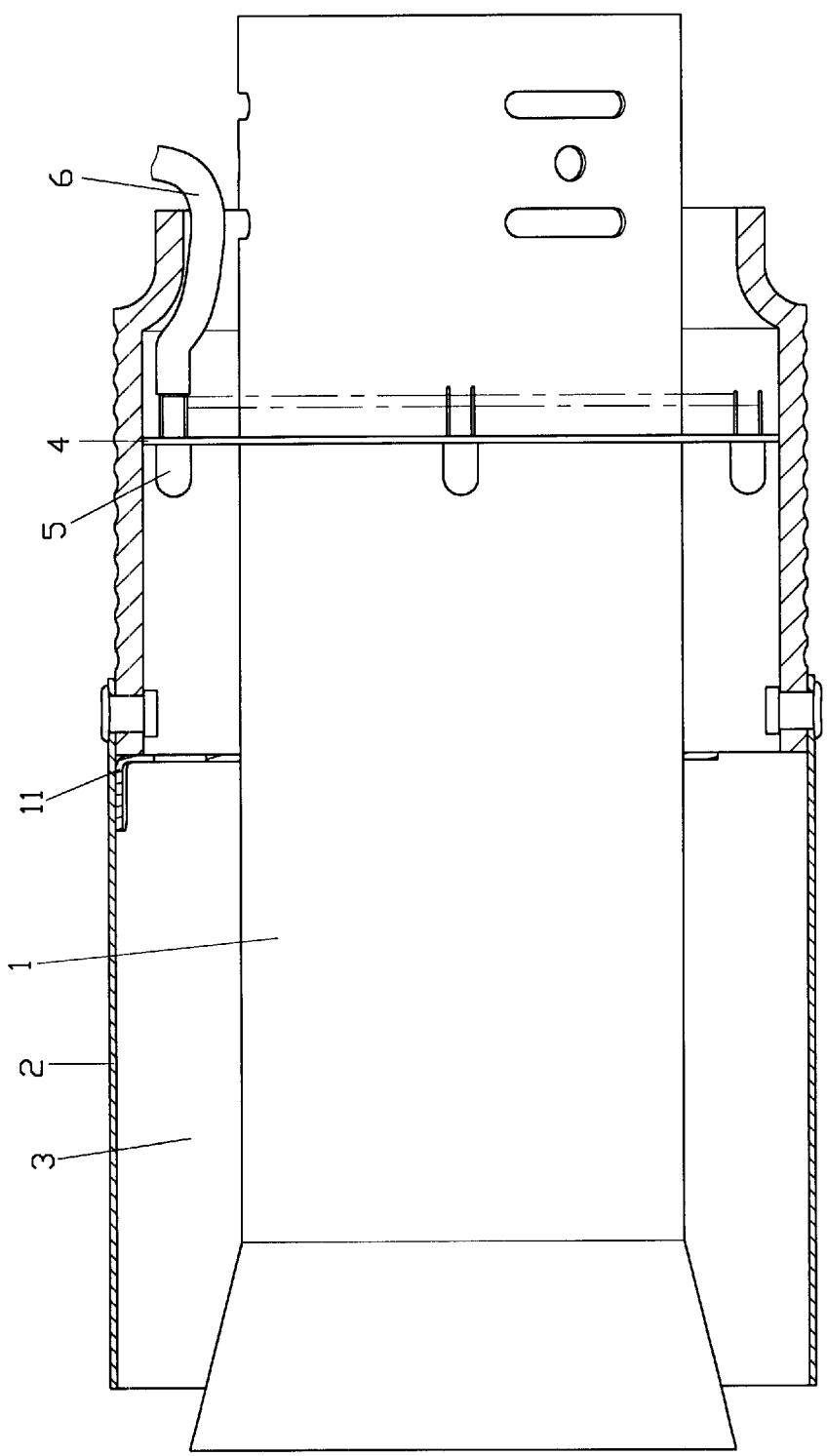
FIG. 2 is a said cross sectional view of FIG. 1.

As shown in FIG. 2, the present system will direct or reflect light from the illuminating device 4 in the gap 3 to the pipe tail in order to form a circular light pattern. If the electric cord 6 is connected to a brake light system, the light may provide an extra warning signal. If there is more than one illuminating device 5, a different color may be applied.

Figure 3:
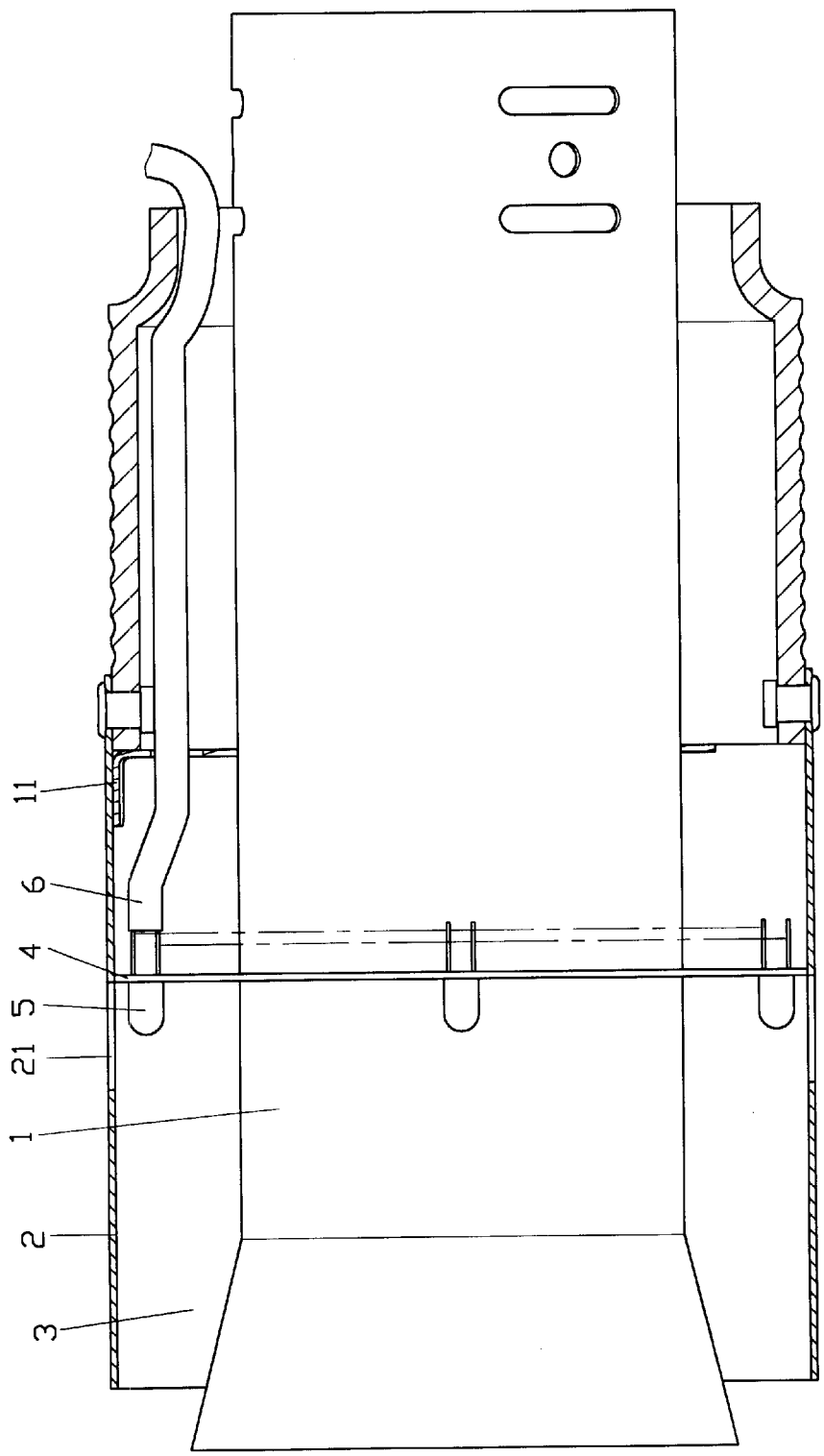
FIG. 3 is a said cross sectional view of a second embodiment of the present invention.

The outer pipe 2, as shown in FIG. 3, may be formed with holes 21 through its wall for the light from the illuminating device 5 to shine through.

Figure 4:
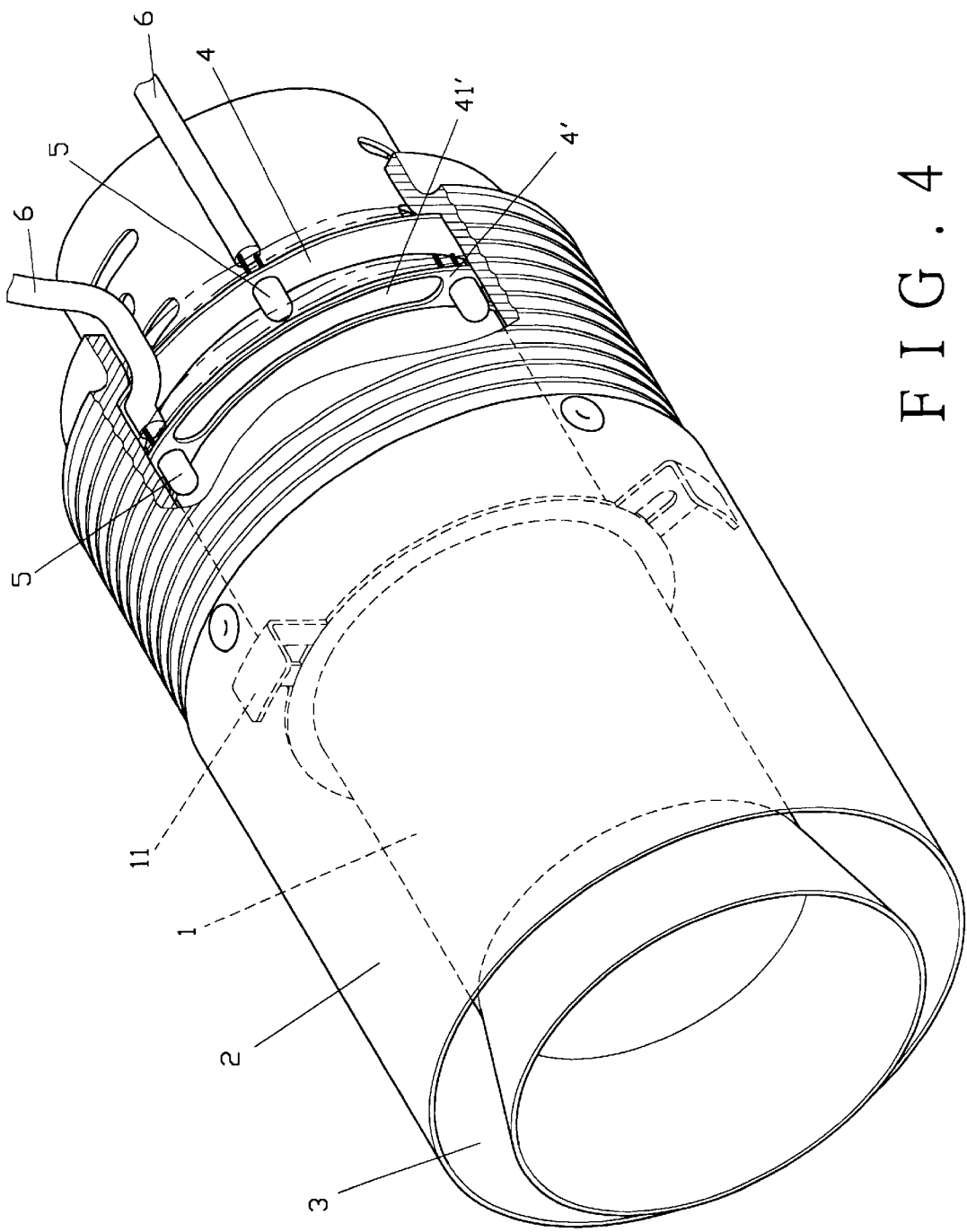
FIG. 4 is a perspective view of a third embodiment of the present invention.

The system includes one light socket 4 connected to at least one illuminating device 5. Additional light sockets 4 and illuminating devices 5 may be added, as shown in the embodiment of FIG. 4. In FIG. 4, a pair of light sockets 4 and 4' are applied with one socket at the front and the other at the rear end in the gap 3. In this Figure, there is a hole 41' for the light of illuminating device 5 to shine through.

With inner pipe 1 enclosed in outer pipe 2, gap 3 remains dark until illuminating device 5 is actuated. Actuation will produce an attractive visual effect. If the electric cord 6 is connected to the brake light system, the illuminating device 5 may be used as a supplemental warning brake signal.

I claim:

1. A vehicular exhaust pipe with illuminating devices, comprising an inner pipe enclosed in an outer pipe, and forming a gap there between, and being characterized in that:

said gap comprising at least one light socket being connected to at least one illuminating device, said light socket and said illuminating device being connected by means of an electric cord, wherein when said illuminating device being turned on, the light will shine through the tail of said exhaust pipe directly or reflectively.

2. The vehicular exhaust pipe with illuminating devices, as recited in claim 1, wherein a controlling device is added between said electric cord and said illuminating device to turn on and off said illuminating device.

3. The vehicular exhaust pipe with illuminating devices, as recited in claim 1, wherein said outer pipe comprises holes on its wall for light to emit there from.

4. The vehicular exhaust pipe with illuminating devices, as recited in claim 1, wherein said illuminating devices have the same color or different colors.

5. The vehicular exhaust pipe with illuminating devices, as recited in claim 1, wherein said light socket has more than one unit.

* * * * *